United States Patent [19]

Okada et al.

[11] Patent Number: 5,182,349

[45] Date of Patent: Jan. 26, 1993

[54] ETHYLENE COPOLYMER AND METHOD OF PRODUCING SAME

[75] Inventors: Tadao Okada, Yokkaichi; Hajime Ikeno, Yokkaichi; Yuji Ozeki, Yokkaichi; Yoshikazu Higaki, Yokkaichi; Koshi Matsubara, Yokkaichi; Kenichi Nakamura, Kashima, all of Japan

[73] Assignee: Mitsubishi Petrochemical Company, Ltd., Tokyo, Japan

[21] Appl. No.: 729,686

[22] Filed: Jul. 15, 1991

[30] Foreign Application Priority Data

Feb. 8, 1990 [JP] Japan ............... 2-203904
Jul. 23, 1990 [JP] Japan ............... 2-192970

[51] Int. Cl.$^5$ ............... C08F 26/06
[52] U.S. Cl. ............... 526/265; 526/352
[58] Field of Search ............... 526/265, 352

[56] References Cited

U.S. PATENT DOCUMENTS 4,276,401 4/1981 Karrer ............... 526/263
4,308,362 12/1981 Wiezer et al. ............... 525/327.6

FOREIGN PATENT DOCUMENTS 1169061 6/1984 Canada .
0063544 10/1982 European Pat. Off. .
0351360 1/1990 European Pat. Off. .
2748362 5/1979 Fed. Rep. of Germany .

*Primary Examiner*—Joseph L. Schoffer
*Assistant Examiner*—Alex H. Walker
*Attorney, Agent, or Firm*—Oblon, Spivak, McClelland, Maier & Neustadt

[57] ABSTRACT

A copolymer is manufactured by allowing ethylene (A) and vinyl compounds (B) represented by the following general formula to undergo radical polymerization at a pressure of 1000–5000 kg/cm$^2$ and a temperature of 100°–400° C.,

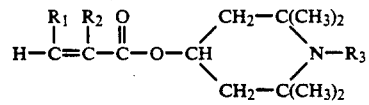

wherein $R_1$ and $R_2$ are each an independent hydrogen atom or a methyl group, $R_3$ is a hydrogen atom or an alkyl group of 1–4 carbon atoms; a ratio of (B) to the sum of (A) and (B) is less than 1 mol %; a proportion of the amount of vinyl compounds (B), which are not successively bonded at all to the units (B) in the chain, but bonded to unlike units (A) on both sides thereof, to the total amount of (B) units in the copolymer is at least a 83%; and an MFR of the copolymer ranges from 0.1 to 200 g/10 min.

Although the copolymer contains only a small amount of the vinyl compound (B) it nevertheless has excellent photo stabilizing effects.

9 Claims, 1 Drawing Sheet

FIG. I

ETHYLENE COPOLYMER AND METHOD OF PRODUCING SAME

BACKGROUND OF THE INVENTION

1. Field of the Invention

The present invention relates to a novel ethylene copolymer and a method of producing same. The ethylene copolymer of the present invention has excellent light stability. The present invention also provides a method of preparing an ethylene copolymer having excellent weatherability in stable conditions wherein residual amounts of unreacted vinyl monomer are strongly suppressed and further the reaction system does not become fouled with the vinyl monomer.

2. Description of the Related Art

Ethylene copolymers are low cost and have excellent moldability as well as optical and physical properties such as transparency and strength and are therefore, applied to practical use in a wide field.

However, they are poor in weather resistance, so there are some restrictions to outdoor applications exposed to direct sunlight. As means of improving weather resistance, it is a general technique to mix the copolymer with a benzophenone family of ultraviolet absorber, a benzotriazole family of ultraviolet absorber, a hindered amine family of light stabilizer etc. However, since these additives will bleed or bloom out gradually, they have insufficient stabilizing effect. In particular, products of small thickness such as film or the like are very prone to bleedout.

It has, therefore, been proposed to make high molecular weight additives to decrease bleedout characteristics. In Japanese Patent Laid-open No. 137358/1982 and U.S. Pat. No. 4,104,248, for example, such proposals are disclosed, and as far as bleedout is concerned the effect caused by increasing the molecular weight by polymerization of the additives can be expected; however, a satisfactory effect is not necessarily exerted owing to possibly insufficient dispersibility thereof when the agent is added to a non-polar polymer such as polyethylene.

In European Patent Laid-open No. 496, there is disclosed a polymer comprising a homopolymer of a vinyl compound having hindered amine in its side chain and a copolymer of it with a polymerizable compound containing at least one double bond, and in European Patent Laid-open No. 63544 discloses an analogous copolymer comprising vinyl compound having hindered amine in its side chain and ethylene.

The polymer of EP-A-496 is obtained by homopolymerizing, in an organic solvent such as benzene, toluene or the like, vinyl compounds respectively which have hindered amines in the side chain, or by copolymerizing said vinyl compound with other copolymerizable monomer under the conditions of adding a free radical initiator such as $\alpha,\alpha'$-azo-isobutyronitrile or the like but applying no extra pressure thereto. In the case of the copolymerization, owing to the difference in the copolymerization reactivity ratio between the polymerizable compound having at least one double bond and the vinyl compound having hindered amine in its side chain, there often developed so-called block structures comprising at least two vinyl compounds, having hindered amines in the side chain, successively bonded; therefore, when the copolymer is used solely or used as a polyblend with other polymers such as polyolefin, there occurs a problem of inadequate photostability.

On the other hand, it is intended in EP-A-63544 to provide an analogous copolymer comprising ethylene and a compound having hindered amine in its side chain, said substance being obtained by an ester interchange reaction between an ethylene/ethyl acrylate copolymer or an ethylene/methyl acrylate copolymer and alcohol having a hindered amine group. Since the ester interchange reaction is a reversible reaction, there remains unavoidably small amounts of acrylate residue, limiting light stabilizing effect of the substance.

A copolymer is also proposed in EP-A-496 which comprises a homopolymer of a vinyl compound having hindered amine in a side chain and a copolymer of it with a polymerizable compound containing at least one double bond having good solubility or compatibility with polymers, and excellent non-extractability from polymers. Nevertheless, nothing is disclosed in the patent regarding a copolymer comprising ethylene.

SUMMARY OF THE INVENTION

As a result of extensive studies performed by the present inventors taking into account such situations, they discovered that the decreased light stability and the decreased compatibility of the copolymer are caused by the block structure comprising at least two vinyl compounds successively bonded having hindered amines in the side chain or unreacted residual ester groups, and that ethylene copolymers containing scant amounts of block structures consisting of at least two vinyl monomers with hindered amines in the side chain bonded successively can be obtained unexpectedly when ethylenes and vinyl groups having hindered amines in the side chain are reacted by high-pressure radical polymerization, to accomplish the present invention.

The present invention is also intended to solve the following problem which occurs particularly when a vinyl monomer that is solid at room temperatures is employed, because said vinyl monomer has poor mutual solubility with ethylene and therefore, when the monomer is supplied stably to a reaction system and when unreacted monomer is recycled after reaction, troubles will occur such as the vinyl monomer fouling the piping in the reaction system or sticking to the outlet and suction valves, and piping of the compressor.

DESCRIPTION OF THE PREFERRED EMBODIMENT

The present invention is first intended to provide an ethylene copolymer in which the copolymer comprises ethylene (A) and vinyl compound (B) represented by the following general formula wherein $R_1$ and $R_2$ are each an independent hydrogen atom or a methyl group, and $R_3$ is a hydrogen atom or an alkyl group of 1–4 carbon atoms; a ratio of (B) to the sum of (A) and (B) is less than 1 mol %; a proportion of the amount of vinyl compounds (B), which are not successively bonded at all to like units (B) in the chain, but bonded to unlike units (A) on both sides thereof, to the total amount of (B) units in the copolymer is at least 83%; and an MFR (Melt Flow Rate) of the copolymer ranges from 0.1 to 200 g/10 min.

The present invention is secondly intended to provide a method for the production of an ethylene copolymer in which the ethylene copolymer is obtained by allowing ethylene (A) and vinyl compound (B) represented by the following general formula to undergo radical polymerization at a pressure of 1000–5000 kg/cm², and a temperature of 100°–400° C., wherein $R_1$ and $R_2$ are each an independent hydrogen atom or a methyl group and $R_3$ is a hydrogen atom or an alkyl group of 1–4 carbon atoms; a ratio of (B) to the sum of (A) and (B) is less than 1 mol %; a proportion of the amount of vinyl compounds (B), which are not successively bonded at all to like unit (B) in the chain, but bonded to unlike units (A) on both sides thereof, to the total amount of (B) units in the copolymer is at least 83%; and an MFR (Melt Flow Rate) of the copolymer ranges from 0.1 to 200g/10 min.

CONCRETE DESCRIPTION OF THE INVENTION

[1] Ethylene Copolymer

The ethylene copolymer of the present invention is obtained by the copolymerization of ethylene (A) and vinyl compound (B) represented by the general formula below wherein $R_1$ and $R_2$ are each an independent hydrogen atom or a methyl group, $R_3$ is a hydrogen atom or an alkyl group of 1–4 carbon atoms.

The most important feature of the present invention is that a proportion of the amount of vinyl compounds of (B), which are not successively bonded at all to like units (B) in the chain, i.e. one (B) is bonded to unlike units (A) on both sides in the copolymer, to the total amount of (B) is at least 83%. The presence of the vinyl compound (B) is identified by the procedure as described below.

According to a known method [see, for example, "Introduction to Instrumental Analysis (1)" p.p. 53–56 (1986) published from Kagaku Dozin], using $^{13}C$ NMR (for example JNM-GSX270 Spectrometer made by Nippon Denshi) and published data on the chemical shift of polyethylacrylate described in the publication ["Handbook on Polymer Analysis" p.969(1985) published by Asakura Shoten] and ethylene-hydroxyethyl acrylate copolymer [see Eur. Poly. J. Vol.25, No. 4, p.p.411–418 (1989)], it was determined that using TMS as a standard, a peak of 32.9 ppm was ascribed to the methylene group situated at the α-position from the branching point of a lone vinyl monomer (B) which is not successively bonded at all to a like unit (B) in the chain, and peak of 35.7 ppm was ascribed to the methylene group inbetween the branching points of two successive (B) vinyl monomers. Using these two signals the ratio of the lone vinyl monomer (B) which is not successively bonded at all to a like unit (B) in the chain to the total vinyl monomer (B) in the copolymer of ethylene (A) and (B) can be computed from the following equation.

$$\frac{\text{peak area at 32.9 ppm}}{\text{peak area at 32.9 ppm} + \text{peak area at 35.7 ppm}}$$

It is necessary that the proportion estimated from the equation of the amount of vinyl monomers with hindered amines in the side chain, which are not successively bonded at all to like units (B) in the chain, i.e. one (B) is bonded to unlike units (A) on both sides to the total amount of the vinyl monomer in the copolymer is not less than 83%. When said proportion of the vinyl monomers having hindered amines in the side chain, which are not bonded successively at all to like unit (B) in the claim, i.e. one (B) is bonded to an unlike unit (A) on both sides, is less than 83%, the feature of excellent light stabilizing effect of the copolymer can not be achieved, when the total content of the vinyl monomers having hindered amines in the side chain being low.

The ethylene copolymer of the present invention requires an MFR (according to the measuring method described in JIS-K6760) ranging from 0.1 to 200 g/10 min, preferably from 0.5 to 20 g/10 min and more preferably from 1 to 5 g/10 min. When the MFR is less than 0.1 g/10 min, the copolymer has poor compatibility with commercially available polyolefin resin or the like and therefore, if it is blended into these resins, it will be a cause of visual defects such as fish-eyes, pimples or the like when used as a film. In addition, when the MFR is more than 200 g/10 min, bleedout and blooming due to diffusion and migration will occur even though the copolymer has an even larger molecular weight, and using it in a blend with other macromolecular materials such as polyolefin etc., will cause the mixture to have decreased strength.

As for the concentration of the vinyl compound (B), which has hindered amines in the side chain, in this ethylene copolymer (the concentration is determined by a known method of nitrogen analysis), the ratio of the vinyl compound (B) to the sum of ethylene (A) and the vinyl compound (B) is less than 1 mol %, preferably 0.0005–0.85 mol %, and more preferably 0.001–0.55 mol %.

Since this copolymer has excellent light stabilizing effect, when used alone, a 0.001 mol % of the content of the vinyl compound (B) with hindered amines in the side chain relative to all structural units of the copolymer (i.e. ethylene and said vinyl compound) is sufficient for achieving light stabilizing effect.

Even in the case of the blend, as the ethylene copolymer by high-pressure radical polymerization of the present invention has excellent light stabilizing effects, concentration of the vinyl compound having hindered amines at the side chain corresponding to a concentration of 0.001 mol %, when the copolymer is used alone, is sufficient. When the copolymer is used as a blending component, if the let down ratio of dilution by weight is at least 1000 times or more, the control of adding accuracy will not be good enough; therefore, when used in a blend, the maximum concentration of the vinyl compound having hindered amine groups in the side chain in this copolymer is 1 mol %. The use of ethylene co- polymers containing vinyl compounds with more than 1 mol % hindered amine groups in the side chains is practically uneconomical.

In addition, as for the polyethylene copolymer of the present invention, it is desirable that the Mw/Mn (Q value) thereof represented by a ratio of weight-average molecular weight and number average molecular weight be in the range of 3-120, in the range of 5-20 being especially preferable and this ratio is determined by using GPC with a calibration curve prepared by means of monodisperse polystyrene.

[2] Preparation of the Copolymer

1. Comonomer

Monomers used for the production of the ethylene copolymer of the present invention are ethylene (A) and the vinyl compound (B) shown by the general formula below (I)

wherein, $R_1$ and $R_2$ are each an independent hydrogen atom or an methyl group, and $R_3$ is a hydrogen atom or an alkyl group of 1-4 carbon atoms.

The monomer of formula (I) is known, and can be synthesized by known methods such as those described in Japanese Patent No. 8539/1972 and Japanese Patent Laid-open No. 65180/1973.

Preferred vinyl compounds (B) are those having formula (I), wherein $R_1$ is a hydrogen atom, $R_2$ and $R_3$ are each an independent hydrogen atom or a methyl group, more preferably $R_1$ and $R_3$ are hydrogen atoms and $R_2$ a hydrogen atom or a methyl group, and most preferably $R_1$ and $R_2$ and $R_3$ are all hydrogen atoms.

As for typical examples of the vinyl compound (B), the following compounds can be given.
(a) 4-acryloyloxy-2,2,6,6-tetramethylpiperidine
(b) 4-acryloyloxy- 1,2,2,6,6-pentamethylpiperidine
(c) 4-acryloyloxy-1-ethyl-2,2,6,6-tetramethylpiperidine
(d) 4-acryloyloxy-1-propyl- 2,2,6,6-tetramethylpiperidine
(e) 4-acryloyloxy-1-butyl-2,2,6,6-tetramethylpiperidine
(f) 4-methacryloyloxy-2,2,6,6-tetramethylpiperidine
(g) 4-methacryloyloxy-1,2,2,6,6-pentamethylpiperidine
(h) 4-methacryloyloxy-1-ethyl-2,2,6,6-tetramethylpiperidine
(i) 4-methacryloyloxy-1-butyl- 2,2,6,6-tetramethylpiperidine
(j) 4-crotonoyloxy-2,2,6,6-tetramethylpiperidine
(k) 4-crotonoyloxy-1-propyl-2,2,6,6-tetramethylpiperidine Among them (a), (b), (f) and (g) are preferable, (a) and (f) are more preferable, and (a) is particularly most preferable.

The monomers described above are essential components for the production of the copolymer of the present invention. A smaller proportion of comonomer components other than these compounds can be copolymerized. As for such comonomers, α-olefins such as propylene etc.; vinyl esters such as vinyl acetate and vinyl propionate; acrylic esters such as methyl acrylate and ethyl acrylate: unsaturated carboxylic acids such as acrylic acid and methacrylic acid; and vinyl silanes such as vinyltrimethoxysilane, γ-acryloyloxypropyltrimethoxysilane and γ-methacryloyloxypropyltrimethoxysilane and the like can be given, and generally it is preferable that the content of each of the compounds is not more than 9 mol %.

2. Preparation of the Copolymer

The production of the copolymer of the present invention is conducted by using a manufacturing system for high-pressure processed low-density polyethylene.

(1) Catalyst

The copolymer of the present invention is manufactured by radical polymerization. Catalysts used in the process of the present invention, therefore, are free-radical initiators.

The following compounds are useful for the catalyst, for example, oxygen; dialkyl peroxides and derivatives thereof such as di-tert-butyl peroxide, tert-butylcumyl peroxide and dicumyl peroxide: diacyl peroxides such as diacetyl peroxide and dioctanoyl peroxide; peroxydicarbonates such as diisopropyl peroxydicarbonate and di-2-ethylhexyl peroxydicarbonate; peroxy esters such as tert-butyl peroxyisobutylate, tert-butyl peroxypivalate and ter-butyl peroxylaurate; ketone peroxides such as methyl ethyl ketone peroxide and cyclohexanone peroxide: peroxy ketals such as 2,2-bis(tert-butyl-peroxy)-octane and 1,1-bis(tert-butyl-peroxy)-cyclohexane, hydroperoxides such as tert-butyl hydroperoxide and cumene hydroperoxide; and azo compounds such as $\alpha,\alpha'$-azoisobutyronitrile.

(2) Polymerization Apparatus

In the present invention, continuous polymerization is preferable. As for the polymerization apparatus, a continuous stirring vessel type reactor or a continuous tubular type reactor generally employed in a high-pressure radical polymerization process for ethylene can be used.

The polymerization can be achieved by using the single reactor mentioned above as a single-stage process, or it is possible to use many reactors connected in series, optionally with additional cooling equipment attached thereto, or to use a single reactor comprising several areas partitioned effectively for multiple-area process. As for the multiple-area process, it is general practice to adjust monomer composition, catalyst concentration, molecular weight modifier content, etc. in each of the reactors or reaction areas so that the properties of the polymer obtained in each of the reactors or the areas may be controlled by giving difference in the reaction conditions in each of the areas or reactors. When plural reactors are used connected in series, the combinations of one or more vessel type reactors and one or more tubular type reactors can be used in addition to the combinations of two or more vessel type reactors or two or more tubular type reactors.

The polymer produced in one, two or more reactors can be treated after the removal thereof from unreacted monomers as in the production of polyethylene by a conventional high-pressure process. The mixture of unreacted monomers is mixed with the same kind of additional monomers, then compressed again and the mixture is allowed to circulate to the reactors. The additional monomers added as described above have a composition which will allow the composition of said mixture to become that of the original feed. In general, the additional monomers have substantially almost the same composition as that of the polymer removed from the polymerization vessel.

Further, in order to obtain a copolymer having a homogeneous composition, a vessel type reactor is preferable.

(3) Supplying the Vinyl Monomer

A catalyst is usually dissolved in a solvent having little chain transfer effect, and is poured directly into a reactor by a high-pressure pump. The concentration of the solution preferably ranges from about 0.5 to about 30 wt %.

As for a suitable example of solvent, there can be given hexane, heptane, white spirits, hydrocarbon oil, cyclohexane, toluene, xylene, branched saturated higher aliphatic hydrocarbons, and mixtures thereof.

In high-pressure radical polymerization, except or special cases, a chain transfer agent is generally employed for the adjustment of the molecular weight of a copolymer produced. As the chain transfer agent, all the agent employed in a conventional high-pressure radical polymerization can be used. For example, there can be given alkanes such as ethane, propane, butane, hexane and heptane; alkenes such as propylene, butene and hexene; alcohols such as methanol, ethanol and propanol; ketones such as acetone and methyl ethyl ketone; and aldehydes such as acetaldehyde and propionaldehyde. Among these, a gaseous compound is introduced into a compressor inlet line and a liquid one is charged by a pump.

Particularly, when vinyl monomers are of solid at room temperature, it is necessary to use them by dissolving them into solvents.

As a solvent for the vinyl monomer, aliphatic alcohols and aliphatic esters are used. Specific examples are aliphatic alcohol such as methanol, ethanol and propanol, and aliphatic esters such as methyl, ethyl, propyl and butyl esters of formic, acetic and propionic acids and mixtures thereof can be also used. In particular, methanol and ethyl acetate are preferred because they have small chain transfer effect as well as excellent solubility with the vinyl compound; therefore, a polymer having relatively higher vinyl monomer content and higher molecular weight can be easily and preferably obtained.

A variety of methods can be considered when a solution of the vinyl monomer in a solvent above is supplied to a reaction system.

For example, in a method wherein a vinyl monomer solution is mixed with ethylene at a low pressure of less than 50 kg/cm$^2$, and the reaction pressure is increased to not less than 1000 kg/cm$^2$, phase separation between the vinyl monomer and ethylene will take place in the compressor, the vinyl monomer is removed by the drain-separator of the compressor, and consequently the monomer composition concentration becomes ununiform, and the vinyl monomer adheres to the suction and delivery valves of the compressor as well as to the piping thereof, and troubles due to fouling can occur easily. Further, although the product and unreacted gas after the polymerization reaction ar generally separated by the high-pressure product separator and the low-pressure product separator, and the unreacted gas is recycled, this was found to be undesirable because the unreacted gas separated in the low-pressure product separator causes phase separation between the vinyl monomer and ethylene in the recycle line and resultingly foul the piping.

In order to avoid such problems, it is necessary for the vinyl monomer solution be mixed with ethylene under a high pressure of at least 50 kg/cm$^2$, then for the pressure of the mixture to be increased to a reaction pressure followed by the supply thereof to the reactor. For example, although pouting the vinyl monomer directly into the reactor by an ultra-high pressure pump can be considered, an ultra-high pressure pump is very expensive and not economical.

Therefore, a method of feeding the vinyl monomer which is in a solid sate at room temperature is preferably to supply the vinyl monomer solution to the suction port of the second stage compressor. Unreacted gas with a pressure of 150–500 kg/cm$^2$, usually separated by the high pressure product separator, is recycled to the suction port of the second stage compressor; therefore, by the method in which the vinyl monomer solution is added to the recycled gas, and then compressed up to the reaction pressure and to the reactor, it becomes possible for the vinyl monomer which is intrinsically poor in compatibility with ethylene and is in a solid state at room temperature to be supplied to the reactor as a fluid having excellent compatibility with ethylene. Consequently, the polymerization reaction will become stable and an ethylene copolymer comprising the vinyl monomer homogeneously as well as randomly copolymerized can be produced.

(4) Polymerization Conditions

The pressure to be employed is at least 1000 kg/cm$^2$, preferably in the range of 1500–4000 kg/cm$^2$, and more preferably in the range of 2000–4000 kg/cm$^2$.

The polymerization temperature is at least 150° C., preferably in the range of 150°–300° C., and more preferably in the range of 150°–250° C.

The higher the polymerization temperature is, the more improved productivity is achieved, however, the more the molecular weight of the copolymer decreases, the harder it is to obtain a high molecular weight polymeric substance. And as the rise of polymer density in the polymerization system, polymerization reaction is liable to be unstable, a low temperature reaction is therefore fundamentally preferable.

Method of Separating Unreacted Gas

The copolymer of the present invention is polymerized in a reactor by high-pressure radical reaction, whereafter the reaction product is separated from monomers in each separator to form final products as it is. On the other hand, the vinyl compound is either solid or liquid at room temperature. In the separation of the reaction product and unreacted gas, if a solid vinyl compound is used, the following conditions are liable to occur.

In the separation of the reaction product and the unreacted gas in the high-pressure separator and the low-pressure separator, the solutions of the vinyl compounds in the unreacted gas have different solubilities to the polymer owing to the differences in physical properties (molecular weight, boiling temperature, melting temperature etc.) of said compounds and solvents. Accordingly, the concentration of the vinyl compound solution increases for each separation of the product, and may reach beyond its saturated concentration depending on the initial condition of the dilution of the vinyl compound into the reactor and the vinyl compound deposits to allow the unreacted gas line to become easily fouled.

The unreacted gas in the high-pressure separator has pressure level of 150–500 kg/cm$^2$; therefore, it is completely dissolved in ethylene gas resulting in no problems. The unreacted gas in the low pressure separator, however, has a pressure as low as 10 kg/cm$^2$ or less, so phase separation will occur between the gas and ethylene to easily develop the condition mentioned above.

To avoid this condition, in the case of using a solid vinyl compound, it is important to separate the vinyl compound from the other unreacted gas at a temperature above the melting point of said compound during the process of separation between the gas and liquid in the unreacted gas.

[3] Usefulness of the Copolymer

The copolymer of the present invention can be used solely as a macromolecular material being less subject to the deterioration caused by the actions of oxygen, heat and light or by the blending thereof with other high molecular weight materials as a stabilizing agent for macromolecular materials. High molecular weight materials used into which the copolymer of the present invention is to be blended to provide increased stability are the following substances; α-olefin homopolymers such as polyethylene, polypropylene, polybutene, poly-3-methylbutene, and poly-3-methylpentene-1; or ethylene-propylene copolymers; or ethylene-α-olefin copolymers such as ethylene butene copolymer. ethylene-hexene copolymer ethylene octene copolymer and ethylene-3-methyl-pentene-1copolymer, ethylene-vinyl acetate copolymer, ethylene-acrylic acid copolymer, ethylene methacrylic acid copolymer, ethylene-methyl acrylate copolymer, ethylene-ethyl arylate copolymer ethylene-butyl acrylate copolymer, ethylene-2 -ethylhexylacrylate copolymer, ethylene-methyl methacrylate copolymer, ethylene-ethyl methacrylate copolymer, ethylene-butyl methacrylate copolymer, ethylene-2-ethylhexylmethacrylate copolymer, ethylene-vinyl-trimethoxysilane copolymer, and a composition comprising a silanol condensation catalyst such as dibutyltin dilaurate or dioctyltin dilaurate blended with ethylene-vinyltrimethoxy-silane copolymer, ethylene-γ-acryloxyloxypropyltrimethoxy-silane copolymer, and a composition comprising a silanol condensation catalyst such as dibutyltin dilaurate or dioctyltin dilaurate blended with ethylene-γ-acryloyloxypropyltrimethoxysilane copolymer, ethylene-γ-methacryloyloxypropyltrimethoxysilane copolymer, and a composition comprising a silanol condensation catalyst such as dibutyltin dilaurate or dioctyltin dilaurate blended with ethylene-γ-methacryloyloxypropyltrimethoxysilane copolymer, dimethoxysilane copolymer, halogen containing synthetic resins such as polyvinyl chloride, polyvinyl bromide, polyvinyl fluoride, polyvinylidene chloride, chlorinated polyethylene, chlorinated polypropylene. polyvinylidene fluoride, brominated polyethylene, chlorinated rubber, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl bromide-vinylidene chloride, vinyl chloride-styrene-maleic copolymer anhydride terpolymer, vinyl chloride-styrene-acrylonitrile terpolymer, vinyl chloride butadiene copolymer, vinyl chloride isoprene copolymer, vinyl chloride-chlorinated propylene copolymer, vinyl chloride-vinylidene chloride-vinyl acetate terpolymer vinyl chloride-acrylate copolymer, vinyl chloride-maleate copolymer, vinyl chloride methacrylate copolymer, vinyl chloride-acrylonitrile copolymer and internal plasticized polyvinyl chloride, petroleum resin, cummarone resin, polystrene, polyvinyl acetate, acrylic resin, copolymers of styrene and other monomers (for example, maleic anhydride, butadiene and acrylonitrile), acrylonitrile-butadiene-styrene copolymer, acrylate-butadiene-styrene copolymer, methacrylate resine such as methacrylate-butadiene-styrene copolymer and polymethyl methacrylate, polyvinyl alcohol, polyvinyl formal, polyvinyl butyral, straight-chain polyester, polyphenylene oxide, polyamide, polycarbonate, polyacetal, polyurethane, cellulosic resin, or phenolic resin, urea resin, melamine resin, epoxy resin, unsaturated polyester resin, and silicon resin. Further, rubbers such as isoprene rubber, butadiene rubber, acrylonitrile-butadiene copolymeric rubber and styrene-butadiene rubber, and blended materials of these resins. In addition, cross-linked polymers such as crosslinked polyethylene or the like which are crosslinked by peroxide or radiation, and foamed polymers such as foamed polyethylene foamed with a foaming agent can be included.

Since the ethylene copolymer of the present invention has excellent weather resistance, it is particularly useful in applications which require great weather resistance such as sheeting for green houses, mulch sheeting film and various types of outdoor pipe.

The ethylene copolymer of the present invention, when used alone, can also include a stabilizer such as phenolic, sulfur containing or phosphorous containing types, a slipping agent such as amide or metallic soap types, and an inorganic compound such as silica or talc.

The ethylene copolymer can also include antistatic agents, anti-fogging agents, neutralizing agents, nucleating agents, and other photostabilizing agents.

When the ethylene copolymer of the present invention is blended into other high molecular weight materials, the additives mentioned above can be blended together.

EXAMPLE

Figure 1:
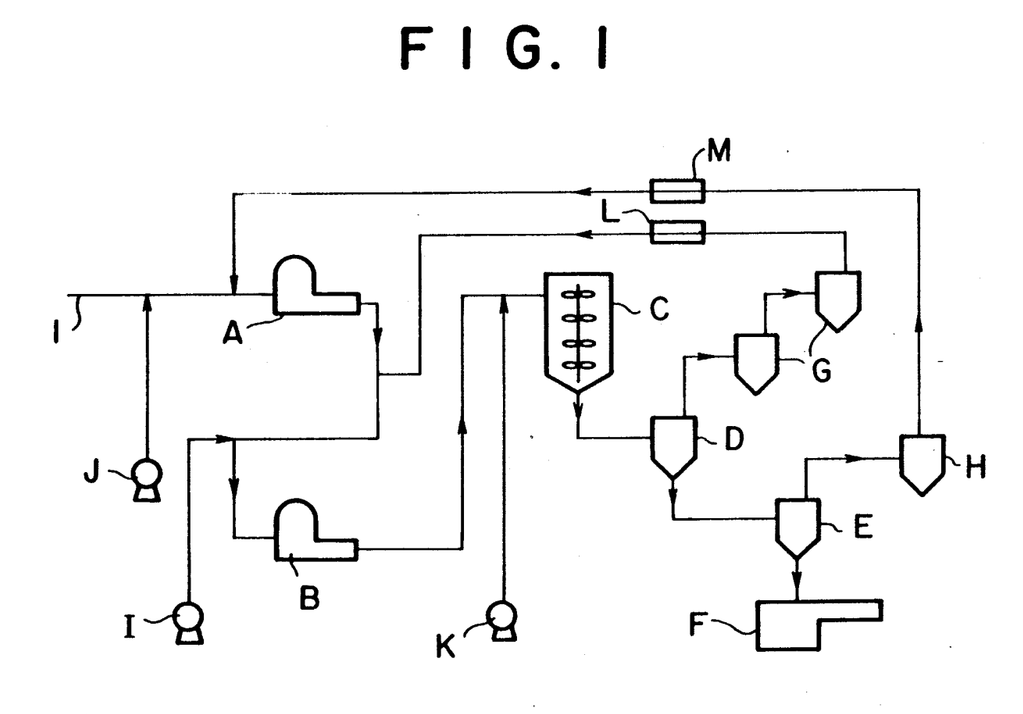
FIG. 1 is a schematic illustration of the apparatus for the manufacture of the copolymer used in the process of the present invention.

The present invention will be specifically illustrated with reference to the following examples using the high pressure polyethylene production system shown in FIG. 1.

EXAMPLE 1

Ethylene was supplied from a line 1 at a rate of 40 kg/h to suction port of a first-stage compressor A. Using 4-acryloyloxy-2,2,6,6-tetramethylpiperidine as a vinyl monomer, a solution of the vinyl monomer dissolved at a concentration of 300 g/L in ethyl acetate was supplied to a suction port of a second stage compressor B by a pump I at a rate of 1.26 L/h. Apart from the ethyl acetate contained in said solution, ethyl acetate as a chain transfer agent was also fed at a rate of 7.0 L/h to the suction port of the first-stage compressor A by a pump J; a solution of tert-butyl peroxypivalate as a catalyst dissolved at a concentration of 5 g/L in normal hexane was supplied at a rate of 0.59 L/h by a pump K to a stirred autoclave type reactor C having an inner volume of 1.5 L; and polymerization was conducted at a polymerization pressure of 2000 kg/cm$^2$, and a polymerization temperature of 200° C.

A reaction mixture drained from reactor C was separated into reaction product and unreacted gas by a high-pressure product separator D, the reaction product being fed into a low-pressure product separator E, while the unreacted gas was recycled into second stage compressor B at the suction port via a high pressure recycle gas line drainage separator G and a high-pressure recycle line filter L. The reaction product from separator E was pelletized by a pelletizing extruder F to obtain a pellet-like copolymer and unreacted gas form separator E was recycled into the suction port of first stage compressor A via a low- pressure recycle gas separator H and a low-pressure recycle line filter M. The resulting copolymer had a MRF of 2.7 g/10 min, a content of 0.5 mol % 4-acryloyloxy- 2,2,6,6-tetramethylpiperidine; a molecular distribution of 8.2 expressed in a ratio of weight average molecular weight to number average molecular weight; the proportion of 4-acryloyloxy-2,2,6,6-tetramethylpiperidine, not successively bonded to other 4-acryloyloxy-2,2,6,6-tetramethylpiperidine units, i.e. 4-acryloyloxy-2,2,6,6-tetramethylpiperidine units that are bonded to ethylene on both on both sides, was 89% according to a measuring method by $^{13}C$ NMR (solvent: 4/1 of $DOCB/C_6D_6$, measuring temperature: 130° C.).

EXAMPLES 2-5

Ethylene copolymers were prepared by using the same apparatus and process described in EXAMPLE 1, except that the pouring amount of a solution of 4-acryloyloxy-2,2,6,6-tetramethylpiperidine in ethyl acetate and the amount of ethyl acetate used as a chain tranfer agent were suitably increased or decreased.

As for the polymerization pressure and temperature during the production, they were kept at about 2000 kg/cm and 200° C. respectively. The properties of the resulting ethylene copolymers are shown in TABLE 1.

EXAMPLE 6

An ethylene copolymer was prepared by using the same apparatus and process described in EXAMPLE 1, except that the same amount of 4-acryloyloxy-1,2,2,6,6-pentamethylpiperidine was used in place of 4-acryloyloxy-2,2,6,6-tetramethylpiperidine. The properties of the resulting copolymer are shown in TABLE 1.

EXAMPLE 7

As in EXAMPLE 6, an ethylene copolymer was prepared by replacing 4-acryloyloxy-2,2,6,6-tetramethylpiperidine in EXAMPLE 1 with the same weight of 4-acryloyloxy-1-butyl-2,2,6,6-tetramethylpiperidine and a minor adjustment control for a pouring amount of the solution of the comonomer in ethyl acetate was carried out. The properties of the ethylene copolymer are shown in TABLE 1.

EXAMPLES 8-10

Ethylene copolymers were prepared according to the same process as that in EXAMPLE 7 using 4-methacryloyloxy-2,2,6,6-tetramethylpiperidine (EXAMPLE 8), 4-methacryloyloxy-1,2,2,6,6-pentamethylpiperidine (EXAMPLE 9), and 4-crotonoyloxy-2,2,6,6-tetramethylpiperidine (EXAMPLE 10).

The properties of these copolymers are shown in TABLE 1.

COMPARATIVE EXAMPLES 1-2

As in EXAMPLES 2-5, ethylene copolymers were produced by suitably increasing or decreasing a feeding amount of a solution of 4-acryloyloxy-2,2,6,6-tetramethylpiperidine in ethyl acetate and an amount of ethyl acetate used as a chain transfer agent.

The properties of the resulting ethylene copolymers are shown in TABLE 2.

COMPARATIVE EXAMPLE 3

(Production according to low-pressure radical polymerization)

Using a 50 L autoclave made of stainless steel fitted with a stirrer, into which was charged 10 L of purified anhydrous toluene, then poured a solution of 2.1 kg 4-acryloyloxy-2,2,6,6-tetramethylpiperidine and 20 g α,α'azoisobutyronitrile in 25 L of extremely purified toluene over a 110-minute interval with stirring in an atmosphere of purified ethylene and at the same time the pressure of the reaction system was increased to 250 kg/cm for polymerization. After increasing the pressure, the polymerization mixture was kept at 100° C.–112° C. with stirring for an additional 70 minutes.

After this the pressure was released and nitrogen gas was introduced, then the mixture was cooled to room temperature under an atmosphere of nitrogen, subsequently poured into 800 L of methanol followed by filtration, washing and drying to obtain final product.

The properties of the copolymer obtained are shown in TABLE 2.

COMPARATIVE EXAMPLE 4

According to the same process described in COMPARATIVE EXAMPLE 3, ethylene was copolymerized, except that a feeding amount of 4-acryloyloxy-2,2,6,6-tetramethylpiperidine was changed from 2.1 kg to 140 g. The properties of the resulting copolymer are shown in TABLE 2.

COMPARATIVE EXAMPLE 5

(Ester interchange reaction of ethylene/acrylate)

A 500 ml four-necked round flask fitted with a stirrer, reflux condenser, thermometer, and nitrogen inlet pipe and placed on an oil bath was charged with 14.5 g of ethylene-ethyl acrylate copolymer having a MFR of 6.2 and an ethyl acrylate content of 7.5 mol %. 15.7 g of 2,2,6,6-tetramethylpiperidine-4-ol and 0.3 g of tetrabutyl titanate. The mixture was heated under an atmosphere of nitrogen with slow stirring at 175° C. for 20 hours. The resulting copolymer was dissolved in 150 ml of anhydrous toluene, then the solution was dropped into an excess amount of anhydrous hexane to deposit the copolymer. After separating the copolymer by filtration, it was suspended into acetone under refluxing to extract the unreacted 2,2,6,6-tetramethylpiperidine-4-ol. The copolymer after extraction was removed by filtration, and then dried at 50° C. for 7 hours under a pressure of 0.2 mmHg.

The properties of the copolymer after ester interchange reaction are shown in TABLE 2.

COMPARATIVE EXAMPLE 6

As in COMPARATIVE EXAMPLE 5, using 2,2,6,6-tetramethylpiperidine-4-ol, ester interchange reaction was carried out. The copolymer used for the reaction was ethylene methyl acrylate copolymer having a MFR of 4.0 and a methyl acrylate content of 0.82 mol %. The properties of the resulting copolymer are shown in TABLE 2.

As for EXAMPLES 1 through 10 and COMPARATIVE EXAMPLES 1 through 6 above and COMPAR- ATIVE EXAMPLE 7 below, the physical property tests described below are conducted.

(1) Film forming properties and resin pressure during extrusion of ethylene copolymer shown only polymer is used:

Using a blown-film molding machine having an extruder with a 20 mm$\phi$ cylinder-diameter and a 50 mm$\phi$ ring die (slit width: 0.8 mm), a film 100$\mu$ in thickness was molded by setting screw speed to 70 r.p.m. at the resin temperature specified in TABLE 1 and TABLE 2 and a blow ratio of 1.5. The film forming properties were identified by visual inspection and the resin pressure was read by a pressure gauge fitted to the cylinder head of the extruder.

(2) Polymer blending:

Blending was carried out by using high pressure processed LDPE having an MFR of 1.0 and a density of 0.920 (according to JIS K-6760) as a resin to be blended, and the number of moles of the comonomer having hindered amines in the side chain were set to be $1 \times 10^{-5}$ in 28 g of the resin to be blended. Blending was performed by mixing the resulting copolymer pellets with polyethylene pellets in a bag for two minutes. After blending, blown film was molded in the same manner as described in (1) and at a resin temperature of 170° C.

For comparison the blown film of the sole high-pressure processed LDPE (low density polyethylene) described above was made in the same manner as described in (1) at a temperature of 170° C. This film sample will be termed COMPARATIVE EXAMPLE 7 hereafter.

(3) Appearance of the film:

The appearance of the film produced by the process (1) for EXAMPLE 5 and COMPARATIVE EXAMPLE 7 and process (2) for the rest of the EXAMPLES was judged by visual inspection.

(4) Haze:

The haze of the film produced by the process (1) for EXAMPLE 5 and COMPARATIVE EXAMPLE 7 and process (2) for the rest of the EXAMPLES was measured by an integrating sphere type light transmittance measuring apparatus according to JIS-K-7105.

(5) Tensile Strength and Elongation:

The cross-axial (perpendicular to the film drawing direction) tensile strength and elongation of the film produced by the process (1) for EXAMPLE 5 and COMPARATIVE EXAMPLE 7 and process (2) for the rest of the EXAMPLES were determined according to JIS-Z-1702.

(6) Presence of Bleedout:

The bleedout of the film produced by the process (1) for EXAMPLES and COMPARATIVE EXAMPLE 7 and process (2) for the rest of the EXAMPLES was determined by visual inspection after an elapse of one month from the production of the film.

(7) Light Stability:

According to ASTM-D-2565 the film produced by the process (1) for EXAMPLE 5 and COMPARATIVE EXAMPLE 7 and process (2) for the rest of the EXAMPLES was exposed to a xenon arc lamp, then tensile test was conducted as described in (5) and the time required for elongation to reach 200% was defined as the life of photo-deteriorated film.

The chemical structure of the vinyl compounds in TABLES 1 and 2 is follows:

TABLE 1

| Item | Unit | Examples | | | | | | | | | |
|---|---|---|---|---|---|---|---|---|---|---|---|
| | | 1 | 2 | 3 | 4 | 5 | 6 | 7 | 8 | 9 | 10 |
| Vinyl compound (B) | — | a | a | a | a | a | b | c | d | e | f |
| MFR | g/10 min. | 2.7 | 2.8 | 0.12 | 180 | 0.11 | 2.0 | 2.5 | 2.2 | 2.9 | 2.7 |
| Number average molecular weight | — | 24,000 | 24,000 | 32,000 | 9,000 | 33,000 | 27,000 | 25,000 | 26,000 | 23,000 | 24,000 |
| $M_W/M_N$ | — | 8.2 | 13 | 4.5 | 4.0 | 4.3 | 8.5 | 10 | 7.1 | 120 | 9.2 |
| Content of vinyl compound | mol % | 0.5 | 0.6 | 0.2 | 0.9 | 0.001 | 0.4 | 0.4 | 0.4 | 0.4 | 0.5 |
| Ratio of vinyl compounds not bonded successivly to like units in chain | % | 89 | 86 | 91 | 86 | 95 | 89 | 87 | 90 | 83 | 85 |
| Presence of foreign molecules | — | Absence | Absence | Absence | Absence | Absence | Absence | Absence | Absence | Absence | Absence |
| Film forming properties of | — | Film formed | Film formed | Film formed | No film forming | Film formed | Film formed | Film formed | Film formed | Film formed | Film formed |

TABLE 1-continued

| Item | Unit | 1 | 2 | 3 | 4 | 5 | 6 | 7 | 8 | 9 | 10 |
|---|---|---|---|---|---|---|---|---|---|---|---|
| polymer used alone | | | | | properties | | | | | | |
| Resin temperature for sole polymer film-forming | °C. | 160 | 160 | 200 | 130 | 200 | 160 | 160 | 160 | 160 | 160 |
| Resin pressure during sole polymer film-forming | kg/cm$^2$ | 70 | 70 | 90 | — | 90 | 80 | 75 | 75 | 70 | 70 |
| Amount of copolymer blended into polyethylene | wt % | 0.20 | 0.13 | 0.50 | 0.11 | 100 | 0.25 | 0.25 | 0.25 | 0.25 | 0.20 |
| Appearance of film | — | Excellent | Excellent | Excellent | Excellent | Excellent | Excellent | Excellent | Excellent | Excellent | Excellent |
| Haze | % | 14 | 14 | 15 | 13 | 18 | 14 | 14 | 14 | 14 | 13 |
| Tensile strength of film | kg/cm$^2$ | 190 | 180 | 180 | 175 | 210 | 185 | 180 | 185 | 180 | 185 |
| Tensile elongation of film | % | 590 | 590 | 580 | 500 | 620 | 590 | 600 | 600 | 590 | 580 |
| Presence of bleed out or blooming | — | Absence | Absence | Absence | Absence | Absence | Absence | Absence | Absence | Absence | Absence |
| Light stability of film | hr. | 11,200 | 11,000 | 11,300 | 10,500 | 12,700 | 11,000 | 11,100 | 11,300 | 10,800 | 11,500 |

TABLE 2

| Item | Unit | 1 | 2 | 3 | 4 | 5 | 6 | 7 |
|---|---|---|---|---|---|---|---|---|
| Vinyl compound (B) | — | a | a | a | a | g | h | None*3 |
| MFR | g/10 min. | 0.08 | 210 | Unmeasurable | Unmeasurable | 5.6 | 3.5 | 1.0 |
| Number average molecular weight | — | 35,000 | 8,500 | 4,500 | 5,000 | 19,000 | 21,000 | 21,000 |
| $M_W/M_N$ | — | 4.0 | 3.5 | 2.3 | 2.1 | 17 | 20 | 25 |
| Content of vinyl compound | mol % | 0.5 | 0.5 | 11 | 0.7 | 7.2 | 0.8 | — |
| Ratio of vinyl compounds not bonded successively to like units in chain | % | 88 | 87 | 76 | 78 | 80 | 81 | — |
| Presence of foreign molecules | — | Absence | Absence | Absence | Absence | *1 | *1 | — |
| Film forming properties of polymer used alone | — | Film formed | No film forming properties | No film forming properties | No film forming properties | Film formed | Film formed | Film formed |
| Resin temperature for sole polymer film-forming | °C. | 220 | 130 | 130 | 130 | 150 | 160 | 170 |
| Resin pressure during sole polymer film-forming | kg/cm$^2$ | 110 | — | — | — | 40 | 50 | 75 |
| Amount of copolymer blended into polyethylene | wt % | 0.20 | 0.20 | 0.02 | 0.15 | 0.02 | 0.13 | 100 |
| Appearance of film | — | Many fish eyes and hard spots | Excellent | Small hard spots | Irregularities | Excellent | Excellent | Excellent |
| Haze | % | 15 | 13 | 14 | 13 | 15 | 16 | 13 |
| Tensile strength of film | kg/cm$^2$ | 150 | 180 | 150 | 140 | 155 | 160 | 185 |
| Tensile elongation of film | % | 400 | 580 | 470 | 450 | 550 | 560 | 590 |
| Presence of bleed out or blooming | — | Absence | *2 | Absence | *2 | Absence | Absence | Absence |
| Light stability of film | hr. | 10,100 | 10,500 | 3,500 | 5,300 | 3,600 | 5,500 | 3,000 |

Note:
*1According to IR and $^{13}$C-NMR, ethyl acrylate copolymerized and methyl acrylate copolymerized were observed in the product of Comparative Examples 5 and 6 respectively.
*2Oil-like bleedout was recognized on the surface of the film.
*3Polyethylene (Mitsubishi POLYETHY-LD YF-30 made by Mitsubishi Petrochemical Company Limited)

COMPARATIVE EXAMPLE 8

Production of a copolymer was tried according to the same method described in EXAMPLE 1 except that the pouring point of the vinyl monomer was changed from the suction port of the second compressor B to which a vinyl monomer is generally fed when a copolymer is being manufactured, to the suction port of the first compressor A in EXAMPLE 1.

As a result, the reaction temperature fluctuated in a range of about 200° C.±10° C., the delivery pressure of the first compressor A changed after about six hours from the start of the reaction, and moreover, a filter M in a low-pressure recycling line was blocked, making it impossible for the reaction to succeed.

As a result of analyzing the copolymer obtained until there was no further reaction, the MFR of the copolymer varied from 2.3 to 4.1 g/10 min, and the content of 4-acryloyloxy-2,2,6,6-tetramethylpiperidine was as low as 0.1 to 0.6%. In addition, bleedout of vinyl monomer at the surface of the polymer was observed.

An analysis of the liquid extracted from the polymer with a solvent by gas chromatography showed that a large amount of unreacted vinyl monomer resided in the polymer.

What is claimed is:

1. An ethylene copolymer having improved light stability which consists essentially of ethylene (A) and vinyl compound (B) represented by the following formula:

wherein $R_1$ and $R_2$ are each an independent hydrogen atom or a methyl group, $R_3$ is a hydrogen atom or an alkyl group of 1-4 carbon atoms; a ratio of (B) to the sum of (A) and (B) is less than 1 mol %; a proportion of the amount of vinyl compounds (B), which are not successively bonded at all to like units (B) in the chain, but bonded to unlike units (A) on both sides thereof, to the total amount of (B) units in the copolymer is at least 83%; and an MFR of the copolymer ranges from 0.1 to 200 g/10 min.

2. A copolymer according to claim 1 wherein the MFR of said copolymer ranges from 0.5 to 20.

3. A copolymer according to claim 1 wherein the ratio of the vinyl compound (B) to the sum of ethylene (A) and the vinyl compound (B) ranges from 0.0005 to 0.85 mol %.

4. A copolymer according to claim 1 wherein the vinyl compound (B) is selected from the group consisting of 4-acryloyloxy-2,2,6,6-tetramethylpiperidine, 4-acryloyloxy-1,2,2,6,6-pentamethylpiperidine, 4-methacryloyloxy-2,2,6,6-tetramethylpiperidine and 4-methacryloyloxy-1,2,2,6,6-pentamethylpiperidine.

5. A copolymer according to claim 1 wherein the vinyl compound (B) is selected from the goup consisting of 4-acryloyloxy-2,2,6,6-tetramethylpiperidine and 4-methacryloyloxy-2,2,6,6-tetramethylpiperidine.

6. A copolymer according to claim 1 wherein the vinyl compound (B) is 4-acryloyloxy-2,2,6,6-tetramethylpiperidine.

7. A copolymer according to claim 2, wherein the MFR of said copolymer ranges from 1 to 5 g/10 min.

8. A copolymer according to claim 3, wherein the ratio of the vinyl compound (B) to the sum of ethylene (A) and the vinyl compound (B) ranges from 0.001 to 0.55 mol%.

9. A ethylene copolymer having improved light stability which consists essentially of ethylene (A) and a vinyl compound (B) represented by the formula:

wherein $R_1$ and $R_2$ are each independently hydrogen or a methyl group, and $R_3$ is a hydrogen atom or an alkyl group of 1-4 carbon atoms; the ratio of (B) to the sum of (A) and (B) is less than 1 mol %; the proportion of the amount of vinyl compounds (B), which are not successively bonded at all to like units (B) in the chain, but bonded to unlike units (A) on both sides thereof, to the total amount of (B) units in the copolymer is at least 83%; and the MFR of the copolymer ranges from 0.1 to 200 g/10 min, said copolymer being obtained by allowing ethylene (A) and the vinyl compound (B) to undergo radical polymerization at a pressure of 1500 to 4000 kg/cm$^2$ and at a temperature of 150° to 300° C.

* * * * *